(12) United States Patent
Zeilstra (10) Patent No.: US 10,287,047 B2
(45) Date of Patent: May 14, 2019

(54) METHOD AND APPARATUS FOR OPTIMIZING AUTOMATED PACKAGING

(71) Applicant: Neopost Technologies, Bagneux (FR)

(72) Inventor: Joost Zeilstra, Drachten (NL)

(73) Assignee: Neopost Technologies, Bagneux (FR)

( * ) Notice: Subject to any disclaimer, the term of this patent is extended or adjusted under 35 U.S.C. 154(b) by 99 days.

(21) Appl. No.: 15/419,442

(22) Filed: Jan. 30, 2017

(65) Prior Publication Data

US 2017/0217620 A1  Aug. 3, 2017

(30) Foreign Application Priority Data

Jan. 29, 2016  (DE) .......................... 10 2016 101 683

(51) Int. Cl.
*G06F 7/00* (2006.01)
*B65B 57/12* (2006.01)
(Continued)

(52) U.S. Cl.
CPC .............. *B65B 57/12* (2013.01); *B65B 5/06* (2013.01); *B65B 35/36* (2013.01); *B65B 43/08* (2013.01); *B65B 57/18* (2013.01); *G05B 19/402* (2013.01); *G06T 7/60* (2013.01); *G06T 7/73* (2017.01); *G05B 2219/35363* (2013.01); *G05B 2219/45048* (2013.01); *G06T 2207/10012* (2013.01)

(58) Field of Classification Search
None
See application file for complete search history.

(56) References Cited

U.S. PATENT DOCUMENTS 6,721,762 B1 4/2004 Levine et al.
8,401,975 B1 * 3/2013 Tian ........................ G06Q 10/08
705/330

(Continued)

FOREIGN PATENT DOCUMENTS

EP  2509875 A1 * 10/2012 ............. B65B 5/024
EP  2 509 875 B1  8/2015
(Continued)

OTHER PUBLICATIONS

Extended European Search Report, dated Jul. 3, 2017, for European Application No. 17153738.4-1927, 9 pages.

*Primary Examiner* — Yolanda R Cumbess
(74) *Attorney, Agent, or Firm* — Cozen O'Connor (57) ABSTRACT

An apparatus for optimizing automated packaging of a shipment set, said shipment set comprising one or more items arranged in an arrangement for being automatically packaged, the apparatus comprising at least one image obtaining device for obtaining three-dimensional image data of said arrangement and at least one computer system and a signaling device, the computer system adapted for processing said image data to obtain information on the dimensions of individual items present in said arrangement and on the orientation and position of said items in said arrangement, performing an analysis of said information with respect to at least one optimization criterion and depending on said analysis, generating signals indicating to either proceed with automated packaging of said arrangement or to modify or to divert said arrangement, and the signaling device adapted for receiving the signals generated.

14 Claims, 10 Drawing Sheets

(51) Int. Cl.
  *G06T 7/73* (2017.01)
  *B65B 5/06* (2006.01)
  *B65B 35/36* (2006.01)
  *B65B 43/08* (2006.01)
  *B65B 57/18* (2006.01)
  *G06T 7/60* (2017.01)
  *G05B 19/402* (2006.01)

(56) References Cited

U.S. PATENT DOCUMENTS

| | | |
|---|---|---|
| 9,102,055 B1 | 8/2015 | Konolige et al. |
| 9,914,278 B2 * | 3/2018 | Pettersson ............... G06Q 50/28 |
| 2008/0020916 A1 | 1/2008 | Magnell |
| 2011/0153082 A1 * | 6/2011 | Franck ................. G01B 11/026 |
| | | 700/259 |

FOREIGN PATENT DOCUMENTS

| | | |
|---|---|---|
| EP | 2 951 098 B1 | 5/2016 |
| WO | 2014188010 A2 | 11/2014 |

* cited by examiner

METHOD AND APPARATUS FOR OPTIMIZING AUTOMATED PACKAGING

TECHNICAL FIELD OF THE INVENTION

The embodiments of the invention relate to a method and an apparatus for optimizing automated packaging of shipment sets, in particular with systems for creating custom sized cardboard boxes and packaging shipments sets in such boxes. The embodiments of the invention also relate to a system for automatically creating custom sized cardboard boxes employing said apparatus respectively said method.

BACKGROUND OF THE INVENTION

In recent years, mail ordering has become increasingly common. In order to cope with the increased need for packaging mail ordered items, different systems and methods for automatically creating packaging boxes have been proposed.

US 2008/0020916 A1 discloses a box-making machine, which executes creasing and cutting acts to obtain a cardboard blank, which is then folded to obtain a packaging box from the blank. The invention may be advantageously used in this type and similar types of machines like the one disclosed in EP 2 951 098 B1.

For making cardboard blanks to be used in box-making machines, usually a long web of cardboard is fed to such machine either from a roll of corrugated cardboard or from a stack, in which the web is zigzag folded into panels. Corrugated cardboard from a roll is flexible in one direction. Without special measures or treatment, it is not well suited for making packaging boxes.

Zigzag folded cardboard has the disadvantage that there are transversal folds in the source material at the positions where the panels are connected. These folds are usually not at positions where folds are needed in a blank that is to be cut from the source material. This is especially the case, when the sizes of the blanks to be cut vary while the panels in a stack of cardboard have a fixed size.

Avoiding that a fold in the source material will appear in the blank limits the maximum blank size (namely to the distance between two folds), and causes an undesired amount of waste material. When such folds are present in a blank that is used to fold a packaging such as a box, there is a risk that the blank will not be folded at the intended crease lines, but at the folds that are already present in the source material. This may cause undesired effects during or after the fold process and may cause crashes and/or damage to the packaging and/or articles being packed or result in an undesired appearance of the packaging and/or insufficient protection of the articles inside the packaging.

WO 2014 188010 A1 proposes an apparatus and a method that allow rigidifying cardboard having at least one fold and obtaining packaging material with increased stiffness from a cardboard stack that is formed by zigzag folding a cardboard web into panels connected via transverse folds, by applying creasing means to form in particular line-shaped indentations on at least one side of said cardboard, wherein at least some of said indentations intersect said at least one fold. This apparatus and method advantageously improve the production of cardboard boxes using cardboard from a stack of a zigzag folded cardboard web with transverse folds in respect of preciseness and/or stability of the cardboard boxes.

EP 2 509 875 B1, which at present is considered to form the closest prior art, discloses a method and a system for automatically creating custom sized cardboard boxes for packaging shipment sets. The term "shipment set" as used herein refers to a single item to be shipped or to multiple items that have been grouped together for shipment.

According to EP 2 509 875 B1, the overall dimensions of said shipment set are obtained by digital imaging after the item(s) forming the shipment set have been arranged manually or automatically for being packaged. Based on the obtained overall dimensions, a cardboard blank to be cut out from zigzag folded cardboard can be calculated. The item(s) may then be rearranged, another digital image is taken and a new cardboard blank is calculated, allowing the user to choose, which blank respectively which box he considers optimal for the respective case.

DISCLOSURE OF THE INVENTION

While upon assembling and packaging a shipment set information about which individual items form the shipment set is obviously present, as otherwise the set could not be assembled, the actual size of the items is often unknown, for example when a database with information on the items does not comprise size information or when the size information is outdated. Besides, the items of a shipment set are often already individually packaged, and the manufacturers of the items sometimes change the dimensions of the individual packages without informing the customers. Some manufactures generally use different sized packages. However, in order to be able to optimize an arrangement of the items for being automatically packaged, it is mandatory to have information on the sizes of the individual items. In order to obtain such size information, EP 2 509 875 B1 suggests obtaining image information of each item individually prior to arranging the items in a shipment set, and to create—based on the obtained information about each individual item—one or more model arrangements, of which an operator arranging the items may choose one for arranging the items.

Obtaining size information of individual items forming a shipment set forces the operator to position each individual item for digital imaging prior to arranging the items in a configuration that he considers appropriate for being processed by a machine for automated packaging. This slows down the packaging process considerably and has turned out to be often not practicable for several reasons. Usually, an order picker configures a shipment set by taking the individual items of the set from storage and then delivers the items to a packaging station, where an operator arranges the items. The arrangement is then transported to a box forming station, where it is automatically packaged. Scanning just the finished arrangement would only give information on the overall dimensions of the arrangement, but not on individual items and alternative arrangements of these items.

SUMMARY OF THE INVENTION

A method and an apparatus allow optimizing the automated packaging process with respect to at least one optimization criterion without slowing down the packaging process.

This is achieved by a method according to claim 1 respectively an apparatus according to claim 7. Advantageous embodiments and implementations are subject of the respective dependent claims. Independent claims 13 and 14 are directed to a system respectively a method for automatically creating custom sized cardboard boxes employing said apparatus respectively said method.

The approach described herein advantageously allows optimizing the packaging process with respect to different optimization criteria without forcing the operator to perform any particular preparation operations that could slow down the packaging process. In its simplest embodiment, the approach described herein may just be used to validate that an arrangement of items could be packaged at a respective system for automatically packaging including a box forming station, i.e. that the overall dimensions of the specific arrangement would not exceed the maximum dimensions of a box, which the respective box forming station is able to create. Hence, the optimization criterion could be the ability to automatically package said arrangement. Other optimization criteria could be speed of the packaging process performed by the packaging system, amount of cardboard used for and/or amount of cardboard wasted upon creating a box for the arrangement at a box forming station of the packaging system, volume of a box for the arrangement, postage, amount of unused space in a box for the arrangement, presence of unwanted folds (e.g., when zig-zag folded cardboard is used) and others.

If it is determined that the arrangement could not be packaged automatically, a signal like a red light may be generated to show the operator that the arrangement has to modified, i.e., that the orientation and/or the position of one or more items have to be changed. The generated signals could also be used for generating images and/or messages on a display device, generating an image showing instructions to modify the arrangement and/or a virtual image of a modified arrangement. The modified arrangement could then be validated again and in case it still could not be packaged, a signal indicating the operator to split the shipment set (if it comprises more than one item) or to divert the arrangement to a station for manual packaging could be generated. Of course, depending on the facilities of a respective system for automatically packaging at which the invention is used, the signals generated may also be used for controlling an apparatus like a gripping and positioning device for automatically modifying the arrangement, and/or for controlling automatic diverting of the arrangement to a special station. Accordingly, the apparatus according to the invention may comprise a transportation device adapted for diverting said arrangement to a station, where it is rearranged or manually packaged.

Accordingly, information on the individual items is obtained, a preferred embodiment comprises automatically suggesting a different arrangement, in which the items are oriented differently with respect to the cardboard used by the machine and/or are positioned differently with respect to each other. Also, it is possible to display an image showing the operator a representation like in particular a wireframe of the individual items and of a box that could be created by the machine, so that he could easily see, which item(s) would have to be rearranged to allow the automated packaging of the shipment set.

The information on the individual items present in the arrangement and on their orientation and position is obtained by processing the image data. This processing is done by at least one computer system adapted for processing said image data, performing an analysis of said information with respect to at least one optimization criterion and generating signals indicating to either proceed with automated packaging of said arrangement or to modify or to divert said arrangement. As is obvious for an expert, the different acts of processing the data, performing the analysis and generating signals may all be done by one computer system may be done by different computers systems.

Processing the image data may also include accessing a product data database with dimensional information on the one or more items in the arrangement and generating a virtual reconstruction of the one or more items in the arrangement. Generating a virtual reconstruction may comprise determining rectangular surfaces in a horizontal, transversal and longitudinal plane, determining edges where said rectangular surfaces adjoin, determining nodes where said edges join, generating the virtual reconstruction from said nodes and edges.

Accessing a product data database could allow integrating additional information in the further process. If the described approach is used to calculate alternative arrangements of items, the additional information may for example allow to take the weight and/or stability of individual items into consideration as it often is advantageous to place heavier or more stable items closer to the bottom of a packaging box than lighter or less stable items. Moreover, if the obtained image data is for some reason not accurate, item information like length, width and height from the database may improve the efficiency of the data processing. In general, the image data will at least allow to determine the orientation and the position of the items in the arrangement, and data from the database may complement this information to calculate the dimensions of a rectangular box that could hold the arrangement. These box dimensions could then easily be compared with the dimensions of boxes that a respective box forming station is able to create or with boxes available for packaging. If no suitable box for the arrangement can be created or is available, feedback can be given to the operator in multiple ways and via different signaling devices. For example a red wireframe of the required box and a green wireframe of the maximum possible box could be shown on a monitor. The feedback could be such that it shows the operator how to reposition the articles to make them fit in a packaging box, and the signaling device could be an optical signaling device, an acoustical signaling device, a monitor or a virtual reality device or a combination of different devices. The feedback could also be that while the arrangement could in principle be packaged, it would be advantageous to modify the arrangement in order to reduce postage, optimize the stability of a box, reduce the amount of cardboard used for forming the box etc. If such suggestions for modifying the arrangement are made, it may be foreseen that the operator could overrule suggestions based on his experience.

In order to access the database, information on the contents of the shipment set such as the respective order may be used, or the items could be scanned with a barcode reader or an RFID scanner if the items bear a respective bar code or RFID tag.

Obtaining the three-dimensional image data can be done e.g., by at least one of using a depth camera, using two or more cameras each being positioned to have a different perspective of the arrangement of articles, using multiple pictures of the arrangement taken by the same camera at different stages during the arranging the items, moving the arrangement relative to a camera and using multiple pictures taken by said same camera at different times during said relative moving, using a background having a specific design.

The method and the apparatus of Applicant's approach are preferably used as part of a system respectively a method for automatically creating custom sized cardboard boxes, but may as well be used at packaging stations were only a certain number of boxes with fixed dimensions is used.

Further objects, features and advantages of the various embodiments of the invention will become apparent from the following non-limiting description of preferred embodiments in conjunction with the accompanying drawing, which comprises 17 figures. The drawing is given to understand the embodiments of the invention, but do also comprise acts and elements, that do not form part of the claimed invention, which is defined in the independent claims.

DESCRIPTION OF PREFERRED EMBODIMENTS

Figure 1:
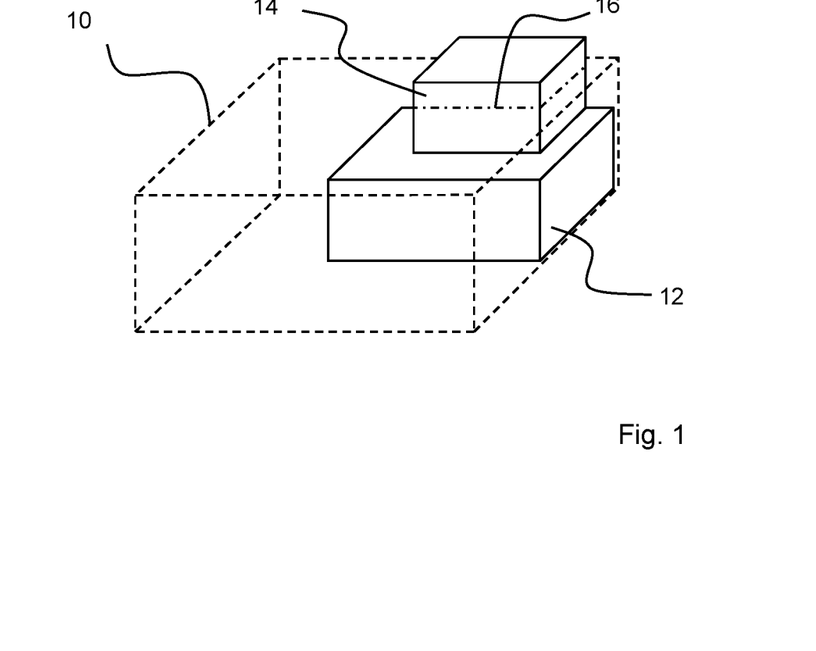
FIG. 1 shows an example of an image displayed for providing visual feedback as to whether an arrangement of items forming a shipment set would fit in a packaging box.
Figure 2:
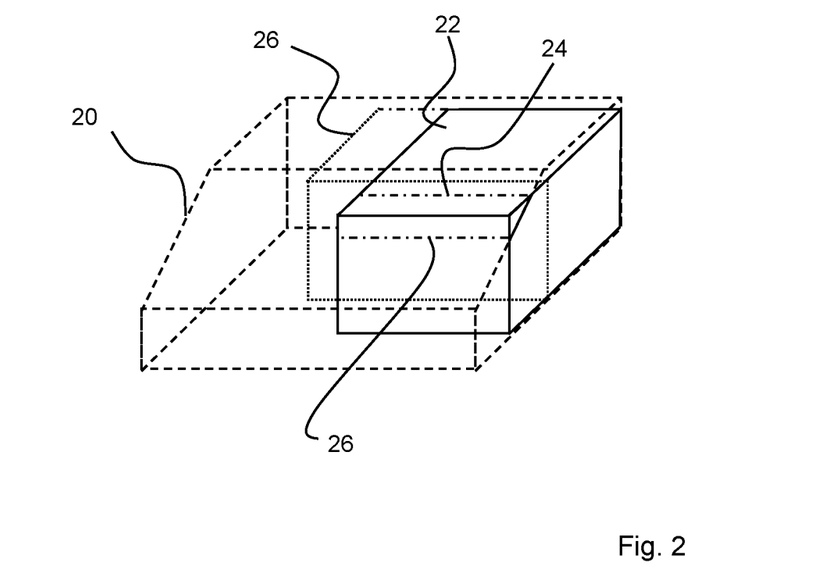
FIG. 2 shows an example of an image displayed for providing visual feedback on a possible modification of the arrangement.
Figure 3:
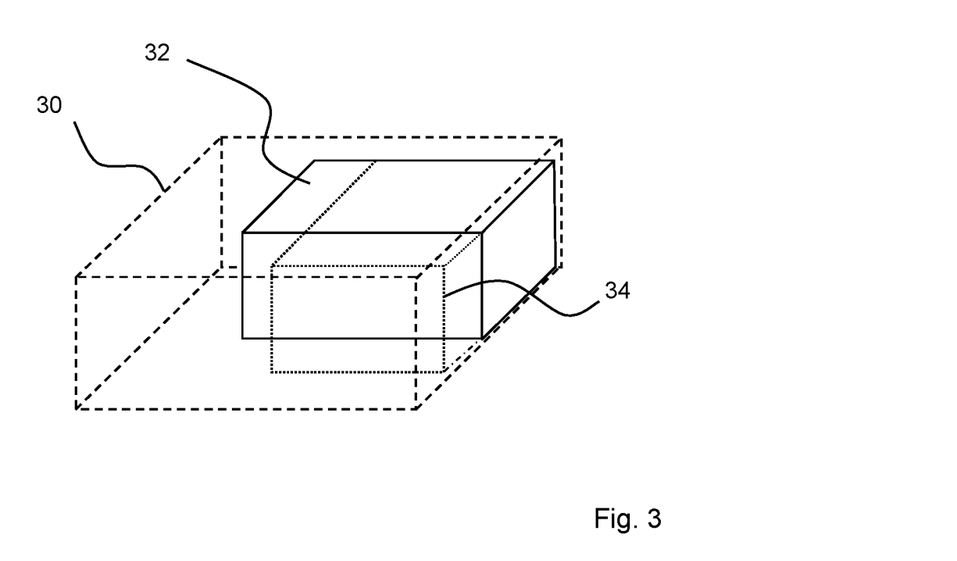
FIG. 3 shows an example of an image displayed for providing visual feedback on an actual arrangement and on a suggested modification of the arrangement.

FIGS. 1 to 3, examples of images, which can be generated according to embodiments of the invention and can be displayed on a display device such as a monitor for providing visual feedback to an operator at a packaging station are schematically shown. In each of these figures, a maximum internal box contour 10, 20, 30 is illustrated in dashed lines. This internal contour corresponds to the maximum outer dimensions an arrangement of one or more items may have to be automatically packaged. In FIGS. 1 and 3, contours 10 resp. 30 have the shape of a rectangular box. In FIG. 2, contour 20 has the shape of a rectangle with a triangular prism taken out at one of the edges, which resembles the height width limitations in a typical automatic packaging system like the one described in EP 2 951 098 B1, where the sum of the height and the width of the created packaging box must be less than the width of the supplied cardboard minus a safety margin. As such automatic packaging system creates only rectangular packaging boxes, a cuboid enveloping the specific arrangement of one or more items has to fit within the inner contour of the packaging box. Practically, this limitation means that a wide arrangement is restricted in height and a high arrangement is restricted in width. For an operator at said packaging system, who prepares an arrangement of one or more items to be packaged, this restriction is usually difficult to recognize, i.e., the human operator has to estimate if the arrangement could fit into a box or not.

In the situations shown in FIGS. 1 to 3, information on the dimensions of individual items present in an arrangement and on the orientation and position of said items in said arrangement has already been obtained and virtual reconstructions of the one or more items in the arrangement have been generated. The items (i.e. their reconstructed contours) are displayed in the images by continuous lines. In FIG. 1, the arrangement consists of two items 12, 14, in FIGS. 2 and 3 the respective arrangement consists of one item 22 resp. 32.

While item 12 would fit into a box having contour 10, item 14 would only partially fit into such box as indicated by dot-dashed boundary line 16. Hence, by looking at an image like the one of FIG. 1, an operator at the packaging system would immediately see that he has to rearrange items 12 and 14. While in the figures continuous, dashed, dot-dashed and dotted lines are use, in practice colored lines and surfaces or even augmented reality pictures could be generated to give feedback to the operator, i.e., a picture showing a photograph of the actual arrangement having lines and/or surfaces superimposed to indicate the dimensions of a box and/or suggestions for rearranging the arrangement.

In FIG. 2, dot-dashed lines 24 and 26 indicate, which part of item 22 would not fit in a box being creatable at a respective box forming station. In this embodiment, the feedback given to the operator includes a suggestion for a possible new arrangement 26 of the item 22 as indicated by dotted lines, which arrangement 26 would fit into a respective box.

In FIG. 3, item 32 already fits into a box having contour 30, but in this embodiment the feedback given to the operator nevertheless includes a suggestion for a possible new arrangement 34 of the item 32 as indicated by dotted lines. In this case, the apparatus according to the invention has determined by performing the analysis mentioned above with respect to the chosen at least one optimization criterion that arrangement 26 would be advantageous over the actual arrangement. It may for example have been determined that the suggested arrangement 26 would lead to less waste cardboard upon creating a respective packaging box or that this arrangement may avoid that an unwanted fold due to the use of zig-zag folded cardboard could deteriorate the quality of a box to be folded. Advantageously, Applicant's approach allows the expert to choose among many different optimization criteria and to take additional information into account like for information about positions of unwanted folds in zig-zag folded cardboard.

Figure 4:
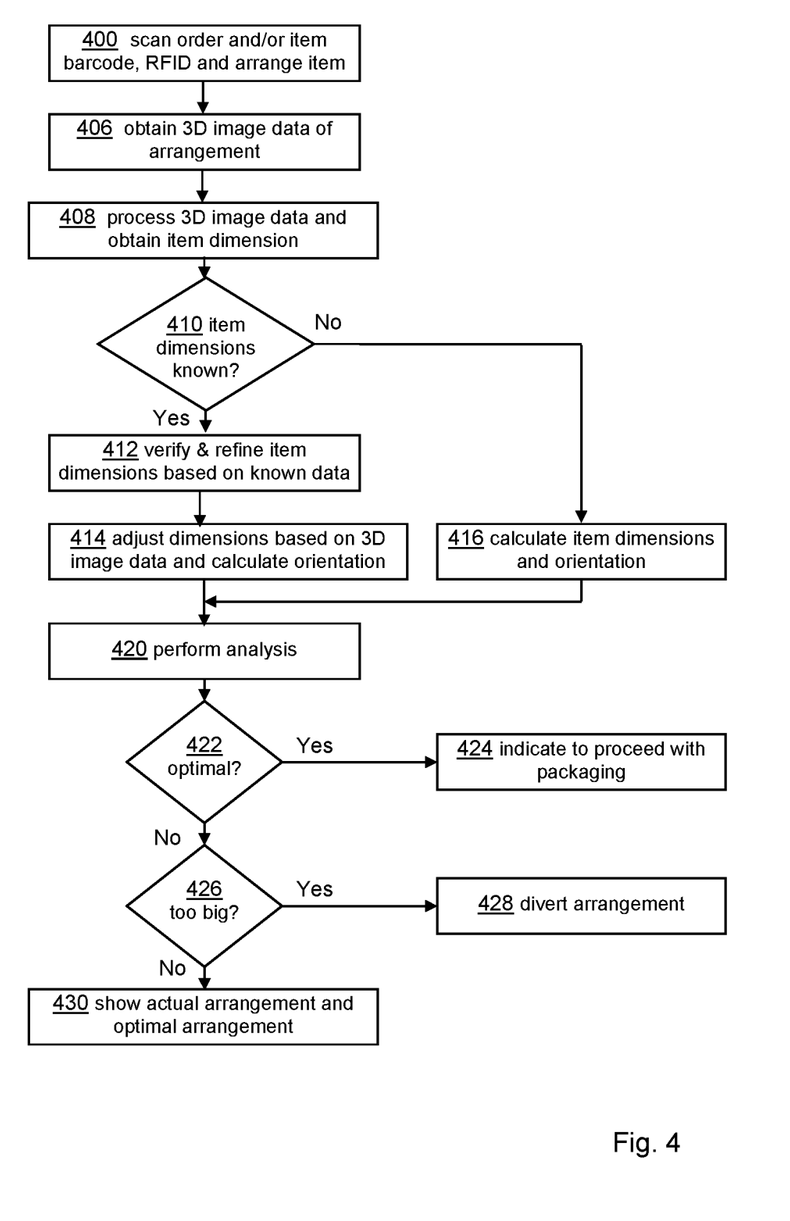
FIG. 4 shows a flow chart of a method according to at least one embodiment of the invention including creating visual feedback on an arrangement of a single item with respect to a packaging box.
Figure 5:
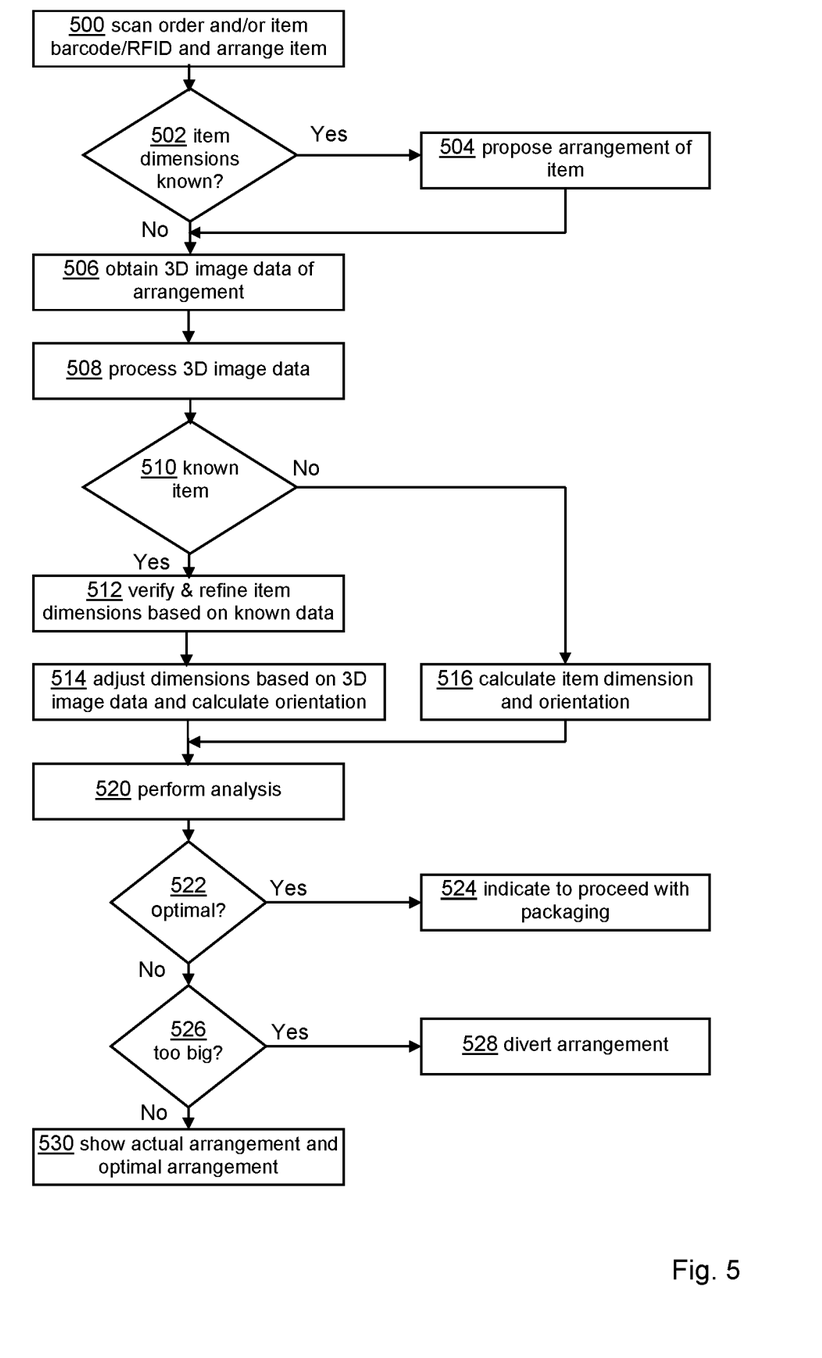
FIG. 5 shows a flow chart of a method according to a different embodiment of the invention including creating visual feedback on an arrangement of a single item with respect to a packaging box.
Figure 6:
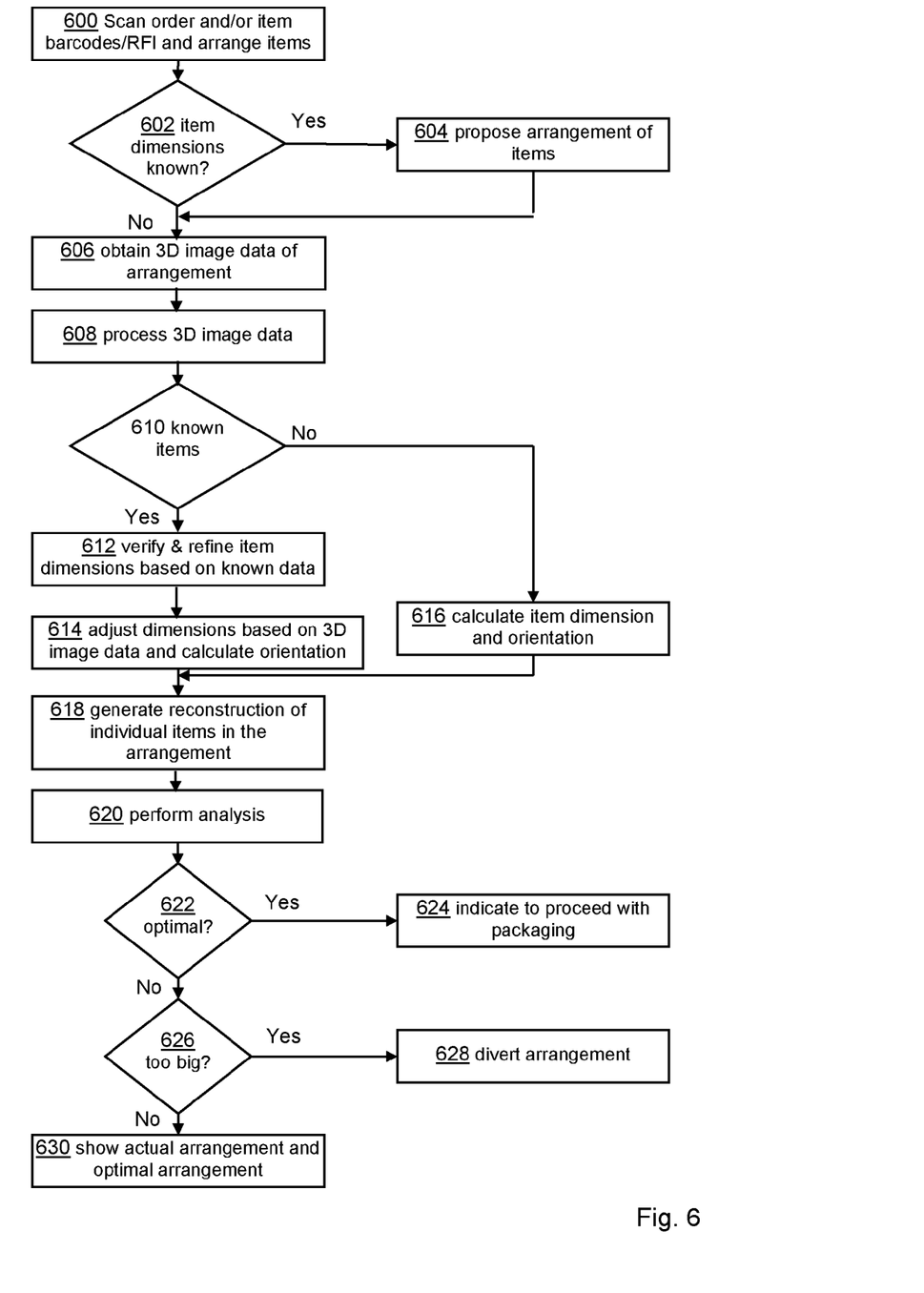
FIG. 6 shows a flow chart of a method according to another embodiment of the invention including creating visual feedback on an arrangement of multiple items with respect to a packaging box.

FIGS. 4 to 6 show flow charts of different methods according to the various embodiments of the invention including creating visual feedback on an arrangement of a single item with respect to a packaging box.

In FIG. 4 a flow chart explaining the acts of detecting the orientation and dimensions of a single item based on a 3D scan and if available item dimensional information, validating if it is a valid (i.e., automatically packageable) arrangement of the item, checking if a more preferred arrangement exists and providing feedback to the operator about the arrangement and a possible preferred arrangement. FIG. 5 shows additional acts leading to immediate feedback on a preferred orientation based on known dimensional information about the item. FIG. 6 shows additional acts, which allow handling of arrangements of multiple items, and contains acts to reconstruct individual items in an arrangement of multiple items. In the following description, a reference number starting with 4 refers to a reference number shown in FIG. 4, a reference number starting with 5 refers to a reference number shown in FIG. 5, and a reference number starting with 6 refers to a reference number shown in FIG. 6.

Acquiring item identification, which is optional, is performed in acts 400, 500, 600 by scanning an order or alternatively via reading a barcode or an RFID tag for each item of a shipment set and the items are arranged at a packaging station for being packaged. In FIGS. 5 and 6, a database in accessed in act 502, 602 and if the dimensions of the identified item are known, an arrangement of said item(s) may in act 504, 604 be proposed to an operator arranging the item(s). As explained above, an optimal arrangement is one that fulfils the chosen optimization criterion or criteria. The database may already contain information on optimal arrangements for specific items or such arrangement could be calculated using item properties obtained from the database.

Next, three-dimensional image data of said arrangement is obtained in act 406, 506, 606 using a device as described above, and in act 408, 508, 608 the image data and optionally data from the database is processed. As indicated by 410, 510, 610, if the items are known, optionally an act 412, 512, 612 of verifying and refining the dimension information based on known data and an act 414, 514, 614 of adjusting the dimensions and calculating the orientation of the item may be performed, otherwise, an act 416, 516, 616 of calculating the item dimensions and orientation solely based on the image data is performed. An analysis of the information thus obtained is performed in act 420, 520, 620 and depending on said analysis, signals indicating to either proceed with automated packaging of said arrangement or to modify or to divert said arrangement are generated. If, as indicated by 422, 522, 622, the analysis shows that the arrangement is already optimal, respective feedback is given at act 424, 524, 624 to proceed with packaging. Depending on the facilities at which the method is employed, an operator may for example activate transportation means to transport the arrangement onto a cardboard blank for forming a box around the arrangement or such transport may be caused automatically.

If it is determined that the arrangement is not optimal, in the shown examples it is checked in act 426, 526, 626 if the arrangement could at all be packaged at the respective packaging station or if it is too big. If the latter is the case, the arrangement may in act 428, 528, 628 be diverted either automatically or manually to a station for special packaging. If the arrangement is not too big but just not optimal, an optimal arrangement is calculated and corresponding feedback is given to an operator, preferably as shown in acts 430, 530, 630 by showing both, the actual arrangement and the optimal arrangement.

Figure 7:
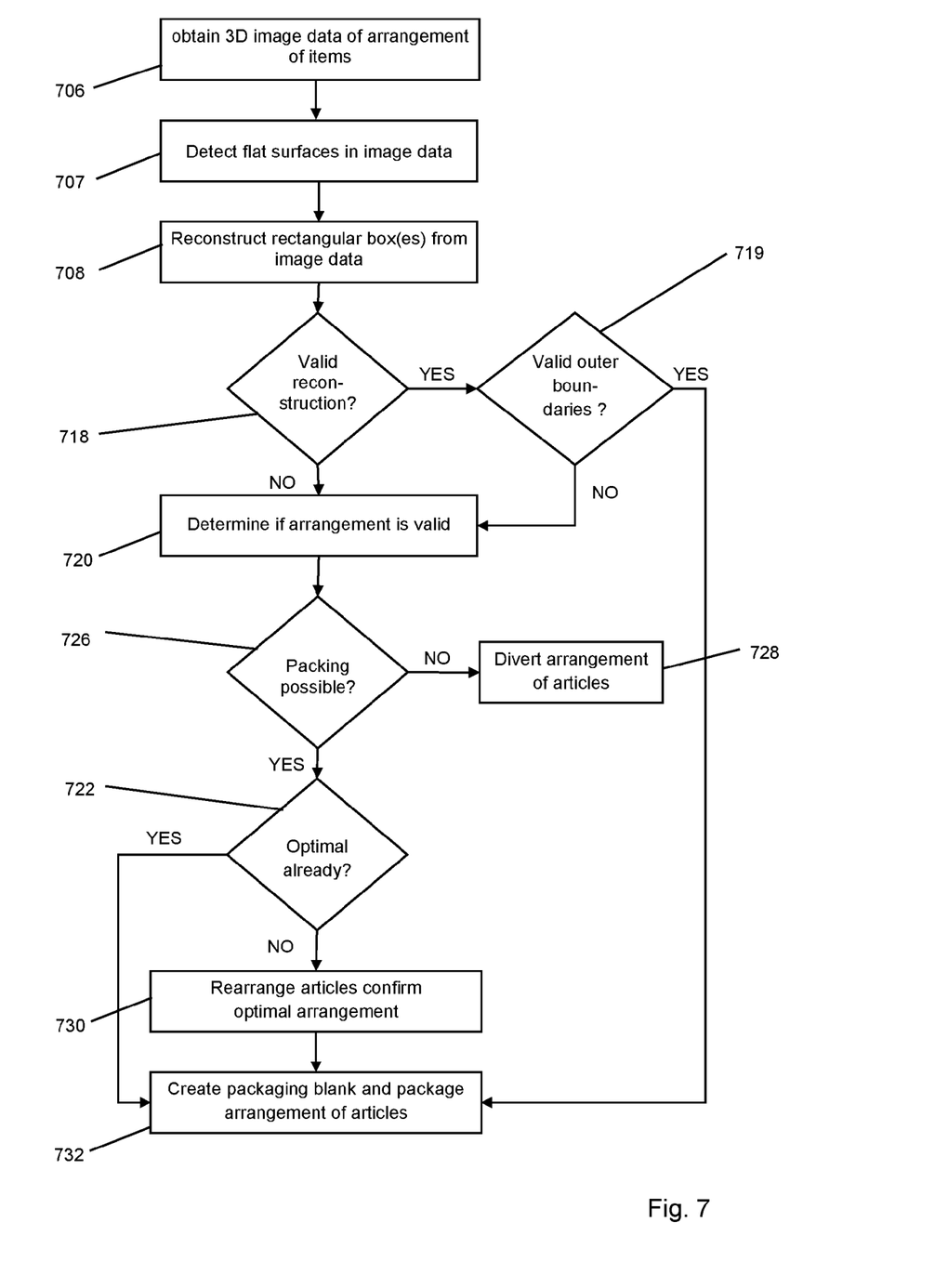
FIG. 7 shows a flow chart illustrating acts, which may be used in a method according to the invention for validating, i.e., checking, if the arrangement could be packaged in a specific packaging box.

FIG. 6 shows an additional act 618 that in a preferred embodiment of the invention is performed in case an arrangement may contain multiple items. In act 618, a reconstruction of the individual items in the arrangement is generated, which could then be used for analyzing the arrangement. This reconstruction may include surface detection acts as explained below in conjunction with FIGS. 13 to 19. Of course, if the arrangement contains just one item, such reconstruction could nevertheless be useful, for example to generate an image with instructions for modifying the arrangement. If for some reason, e.g., unclear image data, it is not possible to identify individual items and their orientation, in act 616 at least the overall dimensions of the arrangement and its general orientation may be calculated and this information may at least be used to validate that the arrangement could at all be packaged at a corresponding packaging station. FIG. 7 shows a flowchart of acts taken in validating that an arrangement of items can be packaged.

In act 706 one or more images of the arrangement of items are made or captured. Preferably one image is enough to determine the arrangement, but if needed multiple images can be used as well. In a preferred embodiment a depth camera is used that creates a 3D image of the arrangement of items. Alternatively normal 2D images may be taken where image recognition techniques are used for detecting the arrangement of items from one or more 2D images.

Figure 8:
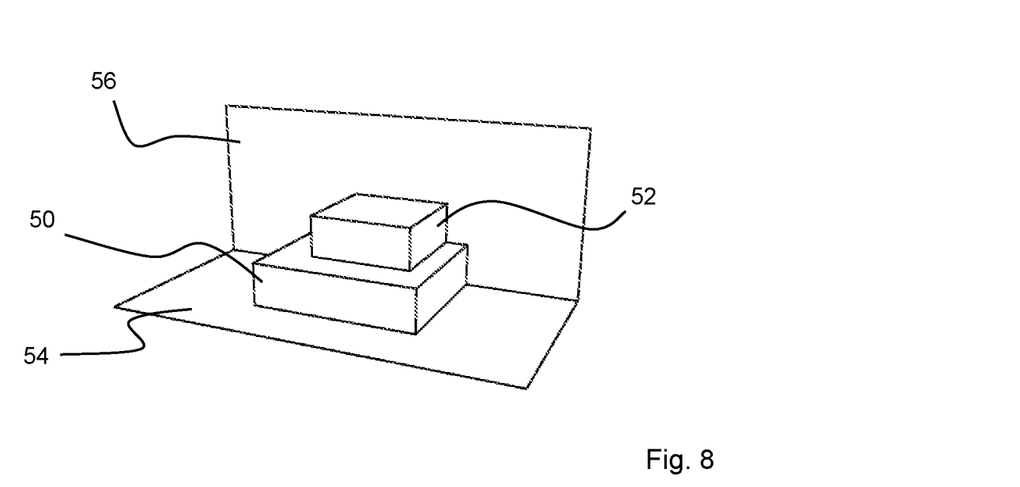
FIGS. 8 to 10 show arrangements of items in front of a background for obtaining the obtaining three-dimensional image data.
Figure 9:
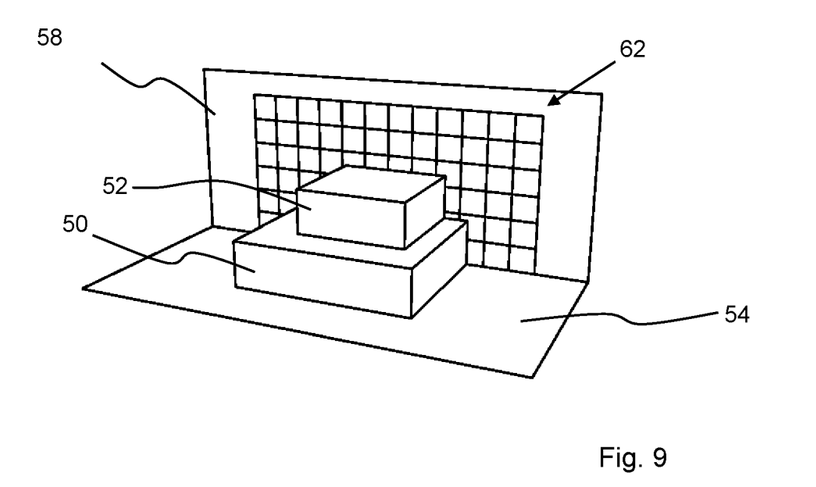
Figure 10:
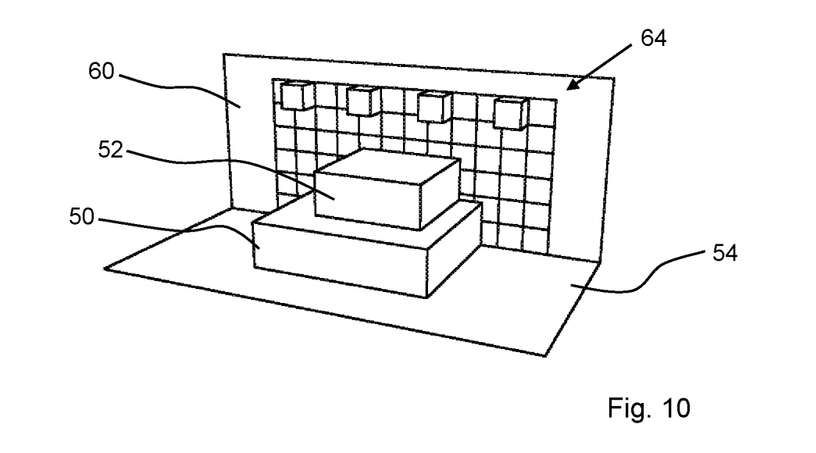

As shown in FIGS. 8 to 10, in order to facilitate detecting the dimensions of an arrangement of (in the example shown) two items 50, 52 on a bottom plane 54, the arrangement can be placed against a back wall 56 resp. 58 resp. 60 that forms a background with a defined or known spatial pattern and that can be used as a reference plane in detecting the arrangement of items. As shown in FIG. 9, back wall 58 may be structured with a grid 62. As shown in FIG. 10, back wall 60 may be structured with an at least partially three dimensional grid 64. A three dimensional grid 64 of known dimensions can facilitate calibrating a 3D camera. A flat 2D grid 62 is more suited for calibrating an algorithm based on 2D images. Together with the always present bottom plane 54, two reference planes are available that can be used in detecting the arrangement.

In act 707, the images are analyzed to detect the flat surfaces that are present in the image. Such surfaces are searched for in all the three main dimensions that are relevant for the item arrangement: the horizontal plane, the longitudinal plane in line with a direction of transporting the arrangement, e.g., to a cardboard blank and the transversal plane perpendicular to the horizontal plane and the longitudinal plane. A successful search will result in one or more rectangular surfaces in all three planes. These surfaces are defined in a three dimensional space. Besides a length and a width they also have a length offset and width offset and a height offset from a virtual origin. Flat surfaces in any other plane will be ignored. It is obvious that in some cases no surfaces may be detected, e.g., if a non-rectangular item is shipped, or that non-rectangular surfaces are detected, e.g., if triangular shaped items are shipped.

Surfaces can be detected by analyzing a plurality of points in the image. The resolution of the image must be sufficient to allow reliable detection of a surface. The plurality of points detected on a surface will be used to establish a zero-thickness (two dimensional) rectangle, i.e., the dimension orthogonal to the surface of the rectangle is a single exact value. Because in many cases, depending on the size of the surface, a fairly large number of points can be used to determine the height offset of the surface from a virtual origin, this will be fairly accurate.

As two items could be placed with their sides aligned with each other it is possible to detect surfaces that are not rectangular. This will be registered as a set of overlapping surfaces. As it is not possible to detect from a single dimension if the items are besides each other or on top of each other it must be registered as such.

Figure 13:
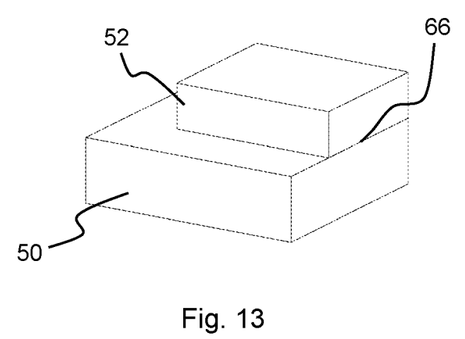
FIGS. 13 to 19 show schematically items and their surfaces, explaining the process of analyzing three dimensional image data.
Figure 14:
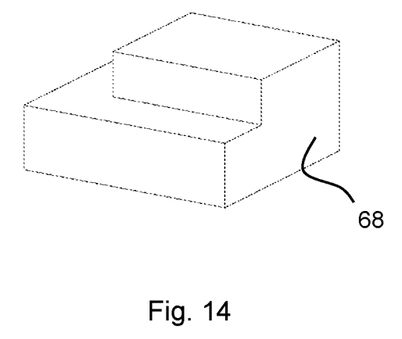
Figure 15:
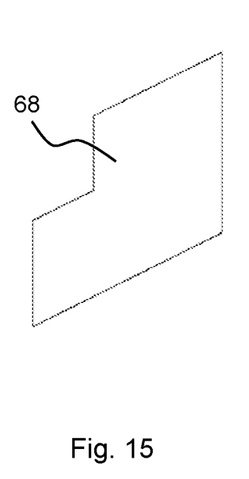
Figure 16:
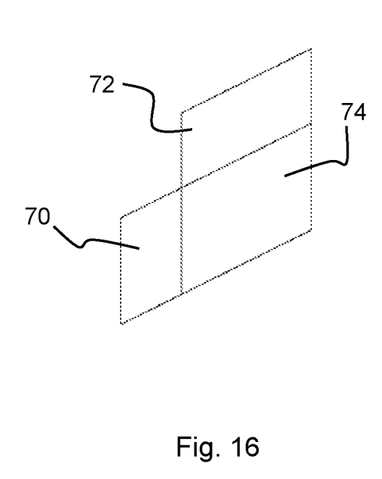

FIG. 13 shows schematically an arrangement of two items 50, 52. The front surfaces of the items are aligned in the same plane. Hence, depending on the resolution of the devices used for obtaining the three dimensional image data, the border line 66 between the items may not be detected and a picture of that plane may only show just one surface 68 as schematically indicated in FIG. 14 and accordingly, in a first act of analyzing such picture, single surface 68 as shown FIG. 15 may be detected in the transversal plane, which covers the front sides of both items and is thus not a rectangular surface. In the example, it is assumed that the items packaged have rectangular surfaces and hence, the surface may be decomposed in rectangular surfaces, such as for example the surfaces 70, 72, 74 shown in FIG. 16.

Figure 17:
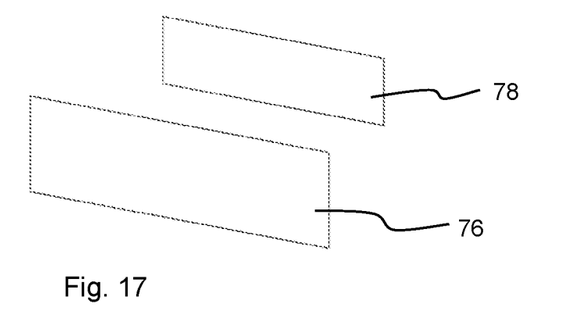

FIG. 17 shows the surfaces 76 and 78 detected in the longitudinal plane in the same perspective view as the arrangement of FIG. 13. In this example, side surfaces of both items are detected, as well as the offset between these two surfaces 76 and 78.

A further action taken is to correlate the edges of the surfaces within the same dimension also they are at different heights/levels, at least in the situation with rectangular shaped items. This feature of rectangular shaped items can be used to align/correct the detected surfaces, i.e., surfaces that share an edge within a margin of for example one cm are most likely at the same level. The edges of both surfaces will be adjusted to a shared value. This adjustment can be applied over different dimensions as well, as each edge will be present in two dimensions. In a specific embodiment, an algorithm first creates for each dimension level lines based on the detected surfaces, which are then aligned over the dimensions to create a more accurate set of surfaces which is consistent over the dimension. It is obvious that such correction can also be done in other ways. Furthermore, in alternative embodiments it may be accounted for non-rectangular artefacts of surfaces, especially in the horizontal plane. Such artefacts may be part of a hidden surface, which is the result of the perspective from which the image is taken. Because such artefacts are likely to occur in the horizontal plane, they could be ignored and cut-off from the detected rectangular surface. Alternatively, they may be included as special category of virtual rectangular surfaces by extending them to their maximum dimension, i.e., till where they end at one of the support planes.

Figure 18:
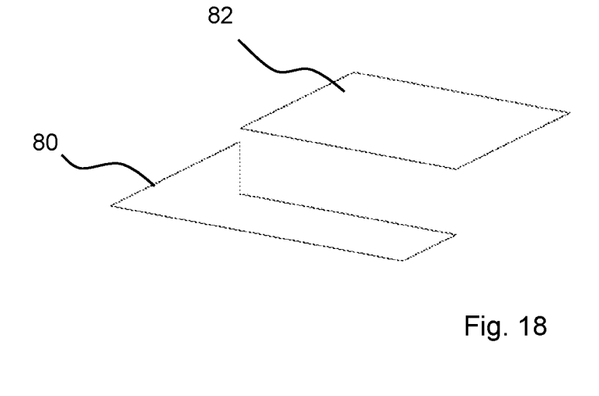
Figure 19:
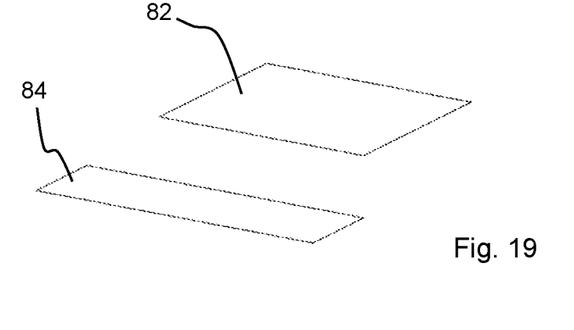

FIG. 18 shows the detected surfaces 80 and 82 in the horizontal plane. The surface 82 of the lower item comprises a non-rectangular extension where part of the surface is hidden by the item that is placed on top of it. With the assumption that all items have rectangular surfaces, as shown in FIG. 19 surface 80 could be corrected to a surface 84 that corresponds to a rectangular surface in the original picture. With the information on the surfaces present in the three planes now available, a representation of each item can be calculated and used to determine an optimal arrangement and to give feedback as described above to an operator.

Detecting surfaces from the 3D or 2D images may comprise filtering to distinguish tilted surfaces from surfaces that are in line with one of the planes in which surfaces are searched. A small angle of a surface with respect to one of the planes is accepted, but will be registered in relation to the surface as it is relevant for the next act in the analysis process.

The images are analyzed also for the outer boundaries of the arrangement of items. For an arrangement of rectangular items only this will be covered by the rectangular surfaces found, but in the situation that there are also non-rectangular items part of the arrangement it is likely that there are also points present that extend one or more of the boundaries defined by the rectangular surfaces.

In act 708 (FIG. 7), the item arrangement is reconstructed from the flat surfaces detected in the previous act. By identifying intersections of surfaces from two different dimensions edges of items are found. As the detected surfaces may not always intersect some margins around the surfaces are applied to find such intersections and thus edges. By correlating all pairs of surfaces from different dimensions a set of edges will be determined. When for a surface two joining edges are found also a node connecting those edges is found.

By combining all the edges a wireframe of an arrangement of rectangular boxes is obtained. Because in the described example an image is taken from a certain perspective, not all surfaces are known. It is therefore necessary to reconstruct the hidden surfaces from the surfaces that are known. Because two directions are limited by the back and ground planes and another three directions are visible for the camera there is only one direction that needs to be reconstructed, which is on particular easy when it is assumed that all boxes are rectangular.

Nevertheless it remains possible to have an arrangement of items which extends from the invisible side in a way that cannot be reconstructed from a single image or from a single perspective. A second camera may be provided to take pictures from a different perspective that covers the side, which is invisible for the first camera, and the reconstructed surfaces from both cameras can be combined to create a comprehensive view. In an embodiment with two cameras, the position and orientation of the cameras can also be chosen to function without a back wall as reference plane.

In act 718 it is checked if a valid reconstruction could be made. If the arrangement could not be reconstructed from the image(s), e.g., because it comprises oddly shaped items, it will be checked in act 719 if the outer boundaries of the arrangement could be reconstructed. If that is the case, it will be assumed that the arrangement consists just of a single item. If no outer box boundaries could be detected, a valid arrangement will be assumed.

In act 720, it is determined if the current arrangement of items is a valid arrangement and also if it is an optimal arrangement. It is checked if the dimensions of the arrangement of items meet the dimensions that are supported by an automatic packaging system and also if a packaging blank can be created to package the arrangement. It is also determined if a different arrangement of the one or more items would result in a more optimal packaging box or in better conditions for creating that packaging box. As explained above, different criteria are used, among others the amount of packaging material needed and restrictions on the packaging blank dimensions that would increase the risk of forming the packaging box correctly. In a specific embodiment using fanfold cardboard as packaging material, an arrangement, in which a fold line present in the packaging material would come to a position in which it would not cause problems forming the packaging box, could be determined.

In act 726 it is checked if packing is possible, either with the current arrangement of the one or more items or with an alternative arrangement of the one or more items. If that is not the case the arrangement of items is diverted in act 728. Diverting can be done automatically by transporting the said arrangement to a divert exit or manually by instructing an operator to take said arrangement away from the system.

In act 722 it is checked if the arrangement is already an optimal arrangement. If that is the case the arrangement can be packaged as it is and the system will proceed with act 732.

In act 730 the arrangement of items is modified according to the preferred optimal arrangement, either automatically or manually. In particular simple modifications like the rotation of a single item can be done automatically, but more complex rearrangements of multiple items can also be automated.

In act 732 the items are packaged. They are 3D scanned to determine the dimensions of the final arrangement of one or more items and based on the determined dimensions a packaging blank is created in which the arrangement of items is packed.

Figure 11:
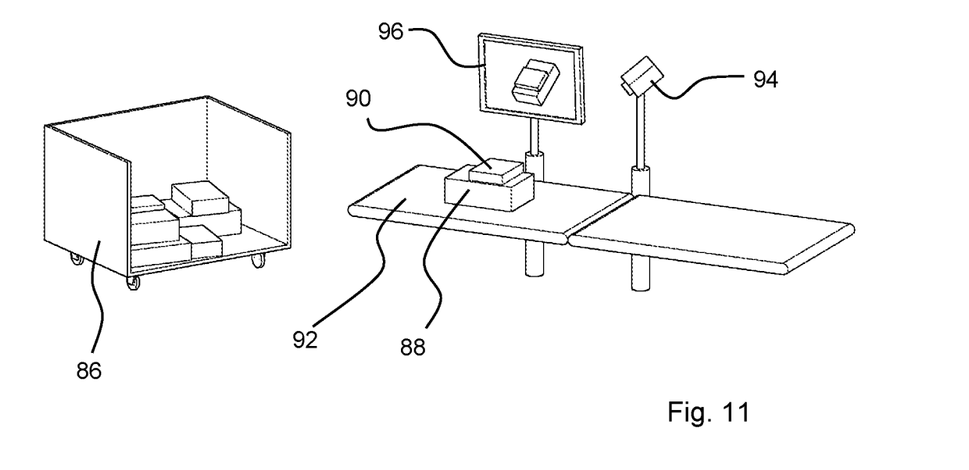
FIG. 11 shows very schematically a first embodiment of an apparatus.
Figure 12:
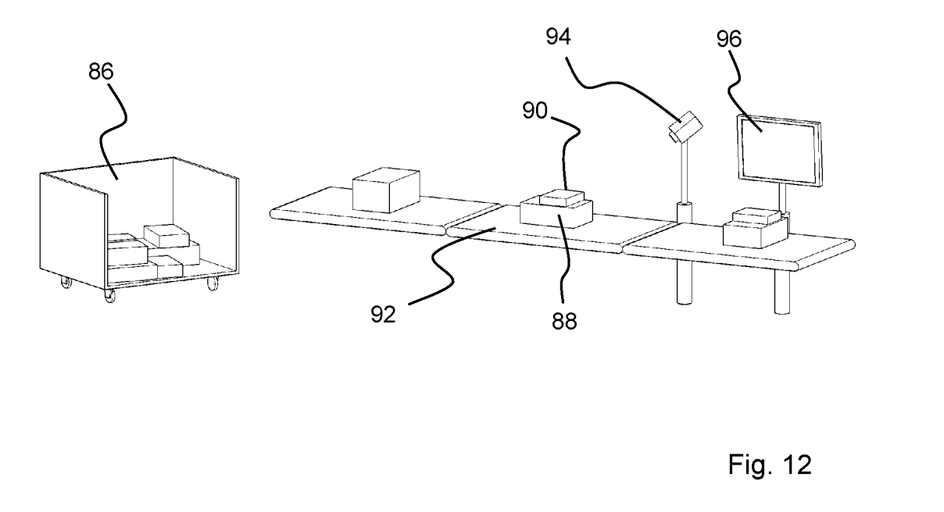
FIG. 12 shows very schematically a second embodiment of an apparatus.

FIGS. 11 and 12 show very schematically two embodiments of an apparatus according to various implementations of the invention. Also shown is a cart 86 with items to be packaged. Items 88, 90 are already arranged on an only partially shown conveyor belt transporting tables 92 for transporting the arrangements of items to a box forming station. A camera 94 is mounted for obtaining three dimensional image data of the arrangement on the tables 92 and is in the shown embodiments also used as an input device for inputting an identification of said items via scanning a code visible on said items.

For providing instructions to an operator, a monitor 96 is positioned close to where the items 88, 90 are arranged for being packaged. The monitor in this example functions as a signaling device in the sense of the invention for receiving signals generated by a computer system (not shown) as explained above from the image data obtained via camera 94. As explained above, the signals can be instructions for an operator and the instructions can be in the form of showing a desired wire frame arrangement of the items, possibly in an augmented reality view, in which the wireframe is superimposed over an actual image of the arrangement of items.

In FIG. 11, monitor 96 is mounted at an upstream position with respect to the mounting position of the camera 94 and a conveying direction of the conveyor belt. In FIG. 12, monitor 96 is mounted at a downstream position with respect to the mounting position of the camera 94 and a conveying direction of the conveyor belt. In FIG. 11, camera 94 and monitor 96 are arranged to give immediate feedback to an operator arranging the items. Such arrangement is particularly useful when based on known properties of the items to be arranged a suggestion for arranging the items shall be shown. In FIG. 12, camera 94 and monitor 96 are arranged to give feedback to a second operator working downstream of the position where the items 88, 90 are arranged and whose only task is to modify, if necessary, arrangements made by a first operator. This could speed up the packaging process and enable higher throughput or, if items of complicated structure are to be packaged, give more time to analyze image data obtained.

The invention claimed is:

1. A method for optimizing automated packaging of a shipment set, the method comprising:
   arranging one or more items forming the shipment set in an arrangement to be automatically packaged,
   obtaining three-dimensional image data of said arrangement,
   processing said image data to identify flat surfaces of said one or more items, in a horizontal plane, a transversal plane, and a longitudinal plane, and to identify edges where said flat surfaces adjoin,
   determining dimensions of individual items, of said one or more items, present in said arrangement and orientation and position of each of said one or more items present in said arrangement,
   performing an analysis of the determined dimensions of the individual items, and the orientation and position of each of said one or more items, with respect to at least one optimization criterion, and
   depending on said analysis, generating signals indicating to either proceed with automated packaging of said arrangement or to modify or to divert said arrangement.

2. The method according to claim 1, wherein said obtaining three-dimensional image data of said arrangement includes at least one of using a depth camera, using two or more cameras each being positioned to have a different perspective of the arrangement of articles, using multiple pictures of the arrangement taken by the same camera at different stages during the arranging the items, moving the arrangement relative to a camera and using multiple pictures taken by said same camera at different times during said relative moving, or using a background having a specific design.

3. The method according to claim 1, wherein said processing said image data includes at least one of using a product data database with dimensional information on the one or more items in the arrangement and generating a virtual reconstruction of the one or more items in the arrangement.

4. The method according to claim 3, wherein generating a virtual reconstruction of the one or more items in the arrangement comprises determining rectangular surfaces in a horizontal, transversal and longitudinal plane, determining edges where said rectangular surfaces adjoin, determining nodes where said edges join, generating the virtual reconstruction from said nodes and edges.

5. The method according to claim 1, said method being employed at a packaging system, wherein said at least one optimization criterion includes at least one of the following criteria: maximum dimensions of boxes that a box forming station of said packaging system is able to create, speed of the packaging process performed by the packaging system, amount of cardboard used for and/or amount of cardboard wasted upon creating a box for the arrangement at a box forming station of the packaging system, volume of a box for the arrangement, postage, presence of unwanted folds, amount of unused space in a box for the arrangement.

6. The method according to claim 1, wherein the generating signals indicating to either proceed with automated packaging of said arrangement or to modify or to divert said arrangement includes at least one of generating optical and/or acoustical signals for an operator, generating at least one of images or messages on a display device, generating an image showing instructions to modify the arrangement and/or a virtual image of a modified arrangement, or controlling an apparatus for automatically modifying the arrangement.

7. An apparatus for optimizing automated packaging of a shipment set, said shipment set comprising one or more items arranged in an arrangement for being automatically packaged, the apparatus comprising:
   at least one imager to obtain three-dimensional image data of said arrangement and
   at least one computer system including at least one processor and at least one nontransitory processor-readable medium communicatively coupled to the at least one processor and which stores at least one of processor-executable instructions or data which, when executed by the at least one processor causes the at least one processor to:
  process said image data to identify flat surfaces of said one or more items, in a horizontal plane, a transversal plane, and a longitudinal plane, and to identify edges where said flat surfaces adjoin,
  determine dimensions of individual items, of said one or more items, present in said arrangement and orientation and position of each of said items present in said arrangement,
  analyze the determined dimensions of the individual items, and the orientation and position of each of said one or more items, with respect to at least one optimization criterion, and
  depending on said analysis, generate signals indicating to either proceed with automated packaging of said arrangement or to modify or to divert said arrangement, and
the apparatus further comprising: a signaling device communicatively coupled to receive the generated signals.

8. The apparatus according to claim 7, wherein said at least one imager includes at least one of a depth camera, two or more cameras positioned to have a different perspective of the arrangement of articles, a camera adapted to take pictures of the arrangement at different stages during arranging said arrangement, a camera adapted to take multiple pictures at different times during a relative movement of the arrangement and the camera, or a camera and a background having a specific design.

9. The apparatus according to claim 7, wherein said at least one processor at least one of:
  retrieves data from a product data database with dimensional information on the one or more items in the arrangement and
  generates a virtual reconstruction of the one or more items in the arrangement.

10. The apparatus according to claim 7, said signaling device including at least one of an optical signaling device, an acoustical signaling device, a monitor, a virtual reality device.

11. The apparatus according to claim 7, further comprising a gripping and positioning device adapted for modifying said arrangement.

12. The apparatus according to claim 7, further comprising a transportation device adapted for diverting said arrangement to a station for rearrangement or manually packaging.

13. A system to automatically create custom sized cardboard boxes, the system comprising:
  at least one imager to obtain three-dimensional image data of an arrangement of one or more items that constitute a shipment set; and
  at least one computer system including at least one processor and at least one nontransitory processor-readable medium communicatively coupled to the at least one processor and which stores at least one of processor-executable instructions or data which, when executed by the at least one processor causes the at least one processor to:
    process said image data to identify flat surfaces of said one or more items, in a horizontal plane, a transversal plane, and a longitudinal plane, and to identify edges where said flat surfaces adjoin,
    determine dimensions of individual items, of said one or more items, present in said arrangement and orientation and position of each of said items present in said arrangement,
    analyze the determined dimensions of the individual items, and the orientation and position of each of said one or more items, with respect to at least one optimization criterion, and
    depending on said analysis, generate signals indicating to either proceed with automated packaging of said arrangement or to modify or to divert said arrangement, and
  the system further comprising:
  a signaling device communicatively coupled to receive the generated signals; and
  a packaging machine that that at least one of positions a packaging blank relative to the arrangement or folds the packaging blank about at least a portion of the arrangement.

14. A method to automatically create custom sized cardboard boxes, the method comprising:
  arranging one or more items forming a shipment set in an arrangement to be automatically packaged,
  obtaining three-dimensional image data of said arrangement,
  processing said image data to identify flat surfaces of said one or more items, in a horizontal plane, a transversal plane, and a longitudinal plane, and to identify edges where said flat surfaces adjoin,
  determining dimensions of individual items, of said one or more items, present in said arrangement and orientation and position of said present in said arrangement,
  performing an analysis of the determined dimensions of the individual items, and the orientation and position of each of said one or more items, with respect to at least one optimization criterion, and
  depending on said analysis, generating signals indicating to either proceed with automated packaging of said arrangement or to modify or to divert said arrangement; and
  creating a custom sized cardboard box in response.

* * * * *

UNITED STATES PATENT AND TRADEMARK OFFICE
CERTIFICATE OF CORRECTION

PATENT NO.        : 10,287,047 B2                                              Page 1 of 1
APPLICATION NO.   : 15/419442
DATED             : May 14, 2019
INVENTOR(S)       : Joost Zeilstra It is certified that error appears in the above-identified patent and that said Letters Patent is hereby corrected as shown below:

In the Claims

Column 13, Line 10, Claim 7:
"position of each of said items," should read --position of said items--.

Column 14, Line 14, Claim 13:
"position of each of said items," should read --position of said items--.

Column 14, Line 43, Claim 14:
"position of said present in said arrangement," should read --position of said items present in said arrangement,--.

Column 14, Line 47, Claim 14:
"one optimization criterion, and" should read --one optimization criterion;--.

Signed and Sealed this
Ninth Day of July, 2019

Andrei Iancu
*Director of the United States Patent and Trademark Office*